US012592856B2

(12) United States Patent
Abdelkader et al.

(10) Patent No.: US 12,592,856 B2
(45) Date of Patent: Mar. 31, 2026

(54) DISTRIBUTED COORDINATION BETWEEN CONCURRENT ML FUNCTIONS

(71) Applicant: Nokia Technologies Oy, Espoo (FI)

(72) Inventors: Abdelrahman Abdelkader, Munich (DE); Stephen Mwanje, Munich (DE); Hajer Braham, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 31 days.

(21) Appl. No.: 18/436,681

(22) Filed: Feb. 8, 2024

(65) Prior Publication Data

US 2024/0356804 A1     Oct. 24, 2024

(30) Foreign Application Priority Data

Apr. 19, 2023    (GB) ..................................... 2305723

(51) Int. Cl.
| | |
|---|---|
| *G06F 15/16* | (2006.01) |
| *H04L 41/0823* | (2022.01) |
| *H04L 41/16* | (2022.01) |

(52) U.S. Cl.
CPC .......... *H04L 41/0823* (2013.01); *H04L 41/16* (2013.01)

(58) Field of Classification Search
CPC . H04L 41/142; H04L 41/0859; H04L 41/082; H04L 41/084; H04L 41/02; H04L 41/0873; H04W 24/02
See application file for complete search history.

(56) References Cited

U.S. PATENT DOCUMENTS

| | | | |
|---|---|---|---|
| 2022/0046410 A1* | 2/2022 | Bega ................... | H04L 41/0893 |
| 2022/0210239 A1 | 6/2022 | Landry et al. | |
| 2022/0292398 A1* | 9/2022 | Norrman ................ | H04L 41/28 |

(Continued)

FOREIGN PATENT DOCUMENTS

| | | | |
|---|---|---|---|
| WO | 2018/233818 A1 | 12/2018 | |
| WO | WO-2021213644 A1 * | 10/2021 | ......... H04L 41/0823 |
| WO | 2021/231734 A1 | 11/2021 | |

OTHER PUBLICATIONS

Nash, "Equilibrium points in n-person games", Proceedings of the National Academy of Sciences of the United States of America, vol. 36, No. 1, Jan. 1950, pp. 48-49.

(Continued)

*Primary Examiner* — Padma Mundur
(74) *Attorney, Agent, or Firm* — SQUIRE PATTON BOGGS (US) LLP

(57) ABSTRACT

Method comprising:
receiving an update information on an updated value of a parameter of a network function and an identifier of a managing function responsible for the updating of the value of the parameter;
defining a favorable range of values of the parameter based on the update information and a history of previous values of the parameter, wherein the history comprises, for each of the previous values of the parameter, the identifier of a respective managing function responsible for updating the value of the parameter to the respective previous value;
calculating a new value of the parameter by optimizing a utility function and taking the favorable range as a constraint for the new value;
updating the value of the parameter of the network function to the new value.

9 Claims, 19 Drawing Sheets

(56) References Cited

U.S. PATENT DOCUMENTS

2023/0141237 A1* 5/2023 Yao ........................ H04L 41/16
709/224

OTHER PUBLICATIONS

"3rd Generation Partnership Project; Technical Specification Group Services and System Aspects; Management and orchestration; Generic management services; (Release 17)", 3GPP TS 28.532, V17.3.0, Dec. 2022, 236 pages.

"3rd Generation Partnership Project; Technical Specification Group Services and System Aspects; Management and orchestration; 5G Network Resource Model (NRM); Stage 2 and stage 3 (Release 18)", 3GPP TS 28.541, V18.2.1, Jan. 2023, 568 pages.

Search Report received for corresponding United Kingdom Patent Application No. 2305723.5, dated Oct. 13, 2023, 3 pages.

Extended European Search Report dated Jul. 3, 2024 corresponding to European Patent Application No. 24156210.7.

Anubhab Banerjee et al., "Game theoretic Conflict Resolution Mechanism for Cognitive Autonomous Networks," 2020 International Symposium on Performance Evaluation of Computer and Telecommunication Systems (SPECTS), SCS, Jul. 20, 2020, pp. 1-8, XP033830867.

Nokia, "pCR 28.908 Requirements on AIML Interference History," 3GPP Draft; S5-224022, 3GPP TSG-SA5 Meeting #, Jun. 2022, E-meeting, Jun. 15, 2022, XP052478177.

* cited by examiner

```
@startuml Procedure 1. Distributed conflict mitigation
skinparam Shadowing false
skinparam Monochrome true
participant "ML function 1" as ML1
participant "Mediation Function" as MF
collections "Network" as Network ML1 -> MF: 1. P1 ChangeLog request(N previous changes)
MF ->ML1 : 2. P1 ChangeLog is sent \n including N previous changes  and DN of responsible
functions
ML1 -> ML1: 3. Learn P1 statistics and optimal parameter set Opt
ML1 -> Network: 4. P1 Change request
end
@enduml
```

Figure 7:
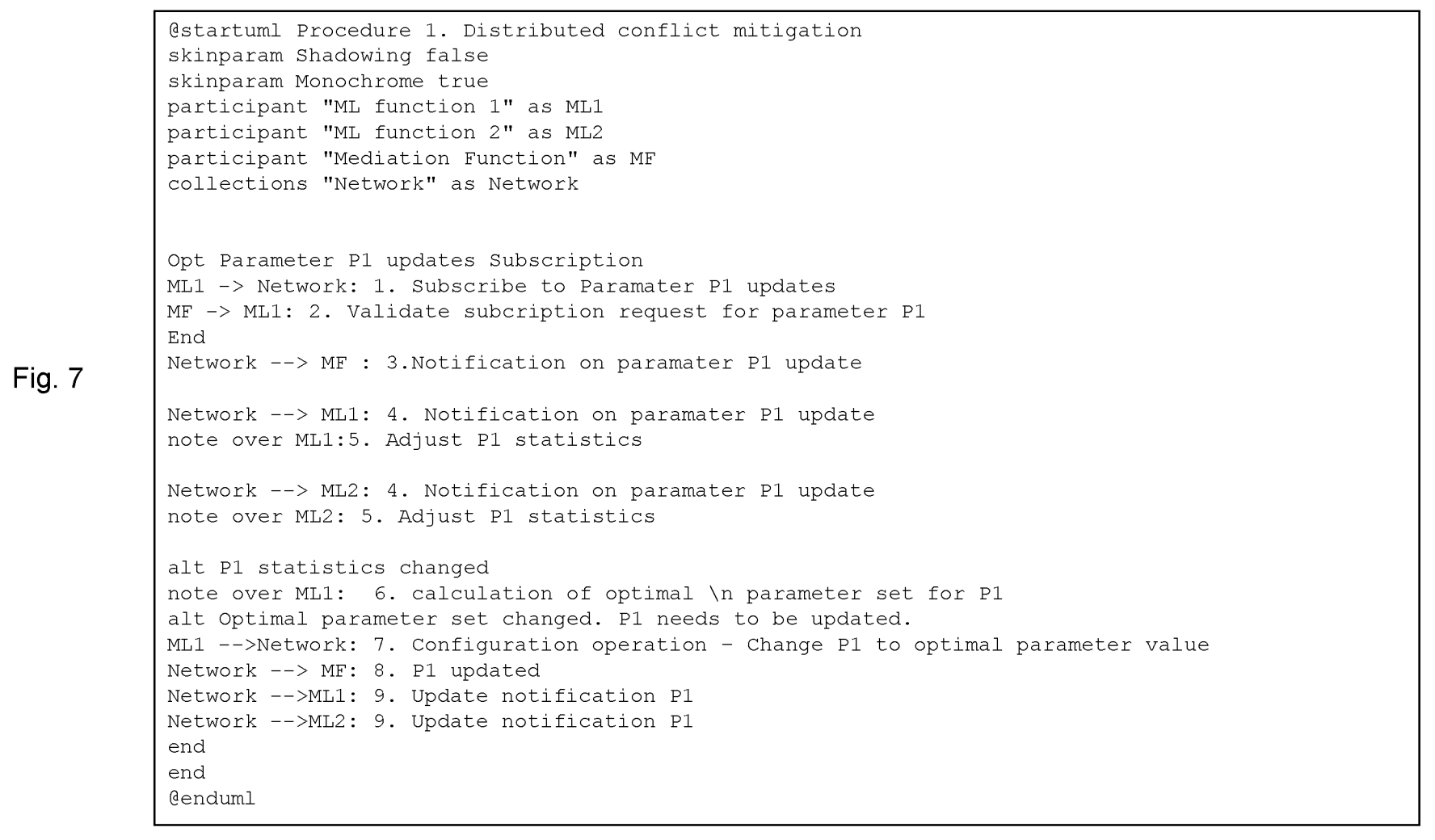

```
@startuml Procedure 1. Distributed conflict mitigation
skinparam Shadowing false
skinparam Monochrome true
participant "ML function 1" as ML1
participant "ML function 2" as ML2
participant "Mediation Function" as MF
collections "Network" as Network Opt Parameter P1 updates Subscription
ML1 -> Network: 1. Subscribe to Paramater P1 updates
MF -> ML1: 2. Validate subcription request for parameter P1
End
Network --> MF  : 3.Notification on paramater P1 update Network --> ML1: 4. Notification on paramater P1 update
note over ML1:5. Adjust P1 statistics Network --> ML2: 4. Notification on paramater P1 update
note over ML2: 5. Adjust P1 statistics alt P1 statistics changed
note over ML1:  6. calculation of optimal \n parameter set for P1
alt Optimal parameter set changed. P1 needs to be updated.
ML1 -->Network: 7. Configuration operation - Change P1 to optimal parameter value
Network --> MF: 8. P1 updated
Network -->ML1: 9. Update notification P1
Network -->ML2: 9. Update notification P1
end
end
@enduml
```

```
@startuml Procedure 1. Distributed conflict mitigation
skinparam Shadowing false
skinparam Monochrome true
participant "ML function 1" as ML1
participant "ML function 2" as ML2
collections "Network" as Network Opt ChangeLogRequest
ML1 -> Network: 1. ChangeLogRequest MOICreation (Get change log of N previous parameter
updates)
Network -> ML1:2. ChangeLogReport is sent back to ML1
End Opt Subscription Process
ML1 -> Network: 3. NtfSubscriptionControl MOICreation (Subscription to receive network \n
events via notifications related to a given Network Object Instance)
Network ->ML1: 4. notifyMOICreation NtfSubscriptionControl
Network -> ML1: 5 notifyMOIChanges (when changes happen)
End Opt Subscription Process
ML2 -> Network: 3. NtfSubscriptionControl (Subscription to \n receive network events via
notifications \n related  to a given Network Object Instance)
Network ->ML2: 4. notifyMOICreation NtfSubscriptionControl
Network -> ML2: 5 notifyMOIChanges (when changes happen)
End ML1 ->ML1:6. Decide to configure parameter P1: \n learn P1 statistics from notifications
ML1 ->ML1:7. Compute P1 optimal parameter set \n constrained to the statistics of P1

ML1 ->Network:8. modifyMOIAttributes (Change request with optimal parameter value to be
applied for parameter P1)

Network ->ML1: 9. notifyMOIChanges (notifications related \n to ML1 change request)
Network ->ML2: 9. notifyMOIChanges (notifications related \n to ML1 change request)
@enduml
```

Fig. 9

```
@startuml
skinparam ClassStereotypeFontStyle normal
skinparam ClassBackgroundColor White
skinparam shadowing false
skinparam monochrome true
hide members
hide circle
'skinparam maxMessageSize 250 class ManagedEntity <<ProxyClass>>
class NEChangeLog <<InformationObjectClass>>
class MLFunction <<InformationObjectClass>>
class ChangeLogRequest << InformationObjectClass >>

ManagedEntity "1" *--> "*" MLFunction: <<names>>
MLFunction "1" *--> "*" NEChangeLog: <<names>>
MLFunction "1" *--> "*" ChangeLogRequest: <<names>> note left of ManagedEntity
    Represents the following IOCs:
        Subnetwork or
        ManagedFunction or
        ManagementFunction
    end note @enduml
```

Fig. 11

```
@startuml TS 28.541 figure 6.2.1-2 (as of MArch 2021)
' UML diagram for 3GPP TS 28.541 clause 6
skinparam ClassStereotypeFontStyle normal
skinparam ClassBackgroundColor White
skinparam shadowing false
skinparam monochrome true
hide members
hide circle
'skinparam maxMessageSize 250 class Top <<InformationObjectClass>>
class Function <<InformationObjectClass>>
class MLFunction <<InformationObjectClass>>
class NEChangeLog <<InformationObjectClass>>
class ChangeLogRequest << InformationObjectClass >>

Function <|-- MLFunction
Top <|-- NEChangeLog
Top <|-- ChangeLogRequest

@enduml
```

Fig. 13

```
@startuml
!pragma teoz true
skinparam ParticipantPadding 5
skinparam BoxPadding 10
skinparam defaultFontSize 12
skinparam lifelineStrategy solid
skinparam SequenceGroupBackgroundColor Transparent
skinparam SequenceGroupBodyBackgroundColor Transparent
skinparam sequenceReferenceHeaderBackgroundColor Transparent
autonumber box "Non-RT RIC" #whitesmoke
    box #ivory
              participant "rApp 1" as app1
              participant "rApp 2" as app2 endbox box "Non-anchored functions in SMO/Non-RT RIC FWK" #cadetBlue
        participant "R1 interface" as R1
        participant "O1-related functions" as O1
    endbox
endbox
participant "Radio node/Near-RT RIC" as dp app1 --> R1 : <<R1>> Query notification subscription (rAppId, SubscribeInfo{P1})
R1 --> O1 : Implementation specific \n subscription request
O1 --> O1 : AuthZ note right
Check authorization in collaboration
with SME functions
end note O1 --> O1: Validate request
ref over O1, dp
As specified in clause 2.1.10
"Subscription Controle" in
O-RAN.WG10.O1-Interface
end
O1 --> R1 : Implementation specific \n subscription response R1 --> app1 : <<R1>> Query notification subscription response (SubscribeInfo)
```

Fig. 15A

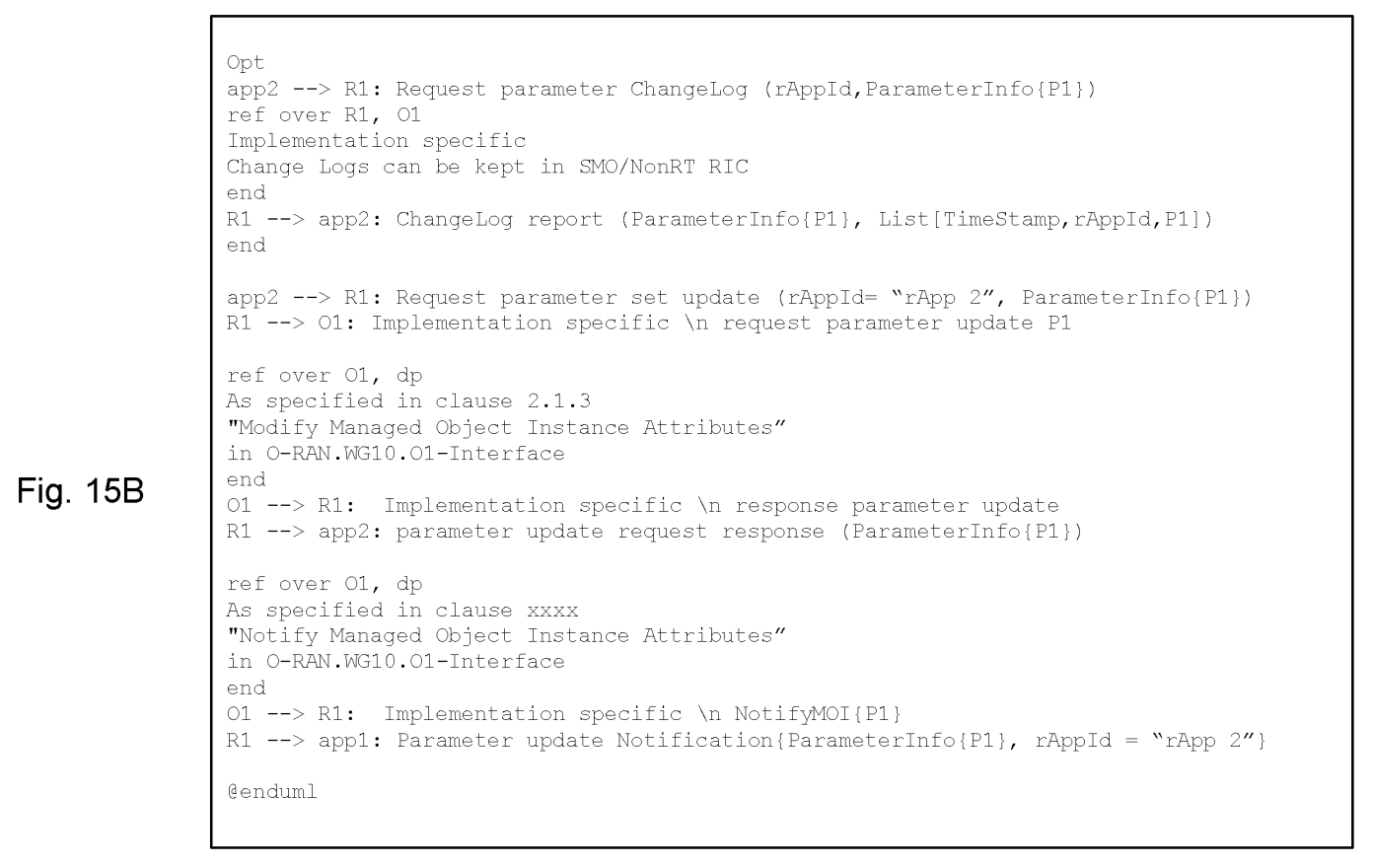

```
Opt
app2 --> R1: Request parameter ChangeLog (rAppId, ParameterInfo{P1})
ref over R1, O1
Implementation specific
Change Logs can be kept in SMO/NonRT RIC
end
R1 --> app2: ChangeLog report (ParameterInfo{P1}, List[TimeStamp,rAppId,P1])
end app2 --> R1: Request parameter set update (rAppId= "rApp 2", ParameterInfo{P1})
R1 --> O1: Implementation specific \n request parameter update P1 ref over O1, dp
As specified in clause 2.1.3
"Modify Managed Object Instance Attributes"
in O-RAN.WG10.O1-Interface
end
O1 --> R1:  Implementation specific \n response parameter update
R1 --> app2: parameter update request response (ParameterInfo{P1})

ref over O1, dp
As specified in clause xxxx
"Notify Managed Object Instance Attributes"
in O-RAN.WG10.O1-Interface
end
O1 --> R1:  Implementation specific \n NotifyMOI{P1}
R1 --> app1: Parameter update Notification{ParameterInfo{P1}, rAppId = "rApp 2"}

@enduml
```

Fig. 15B

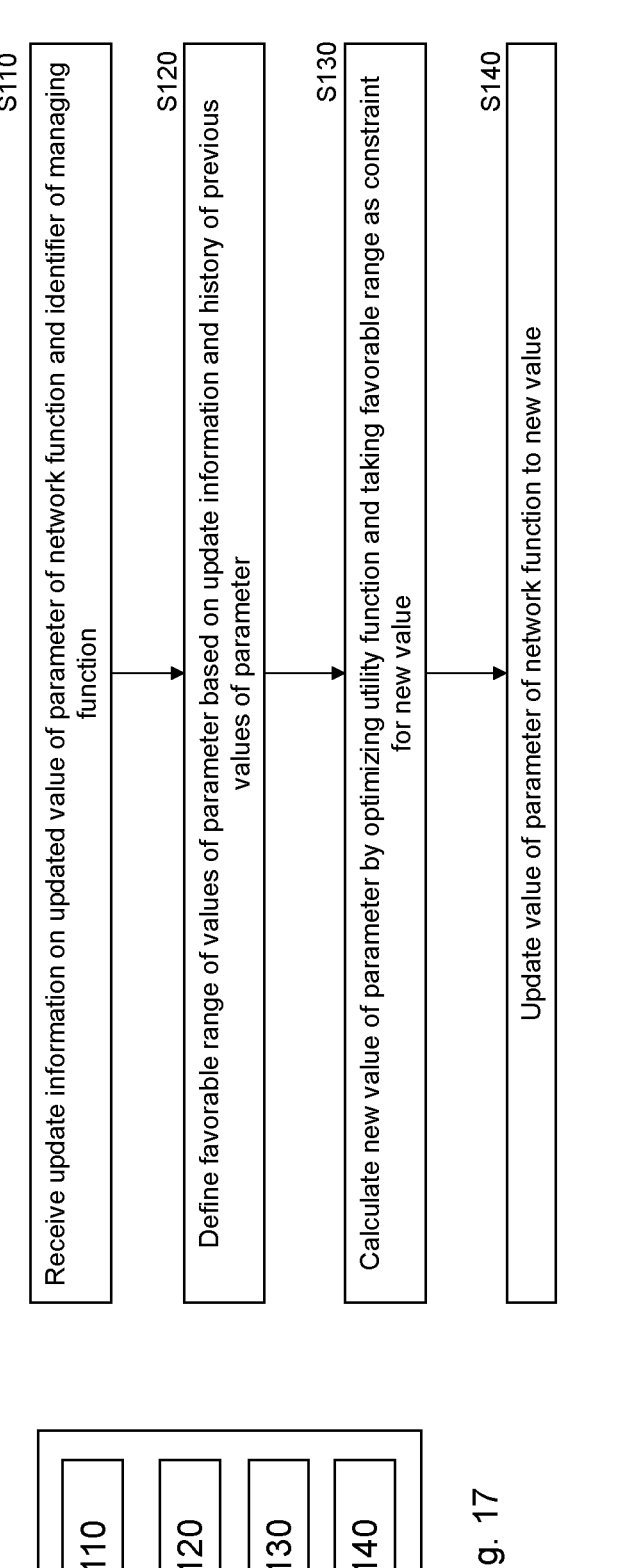

S110

Receive update information on updated value of parameter of network function and identifier of managing function

S120

Define favorable range of values of parameter based on update information and history of previous values of parameter

S130

Calculate new value of parameter by optimizing utility function and taking favorable range as constraint for new value

S140

Update value of parameter of network function to new value

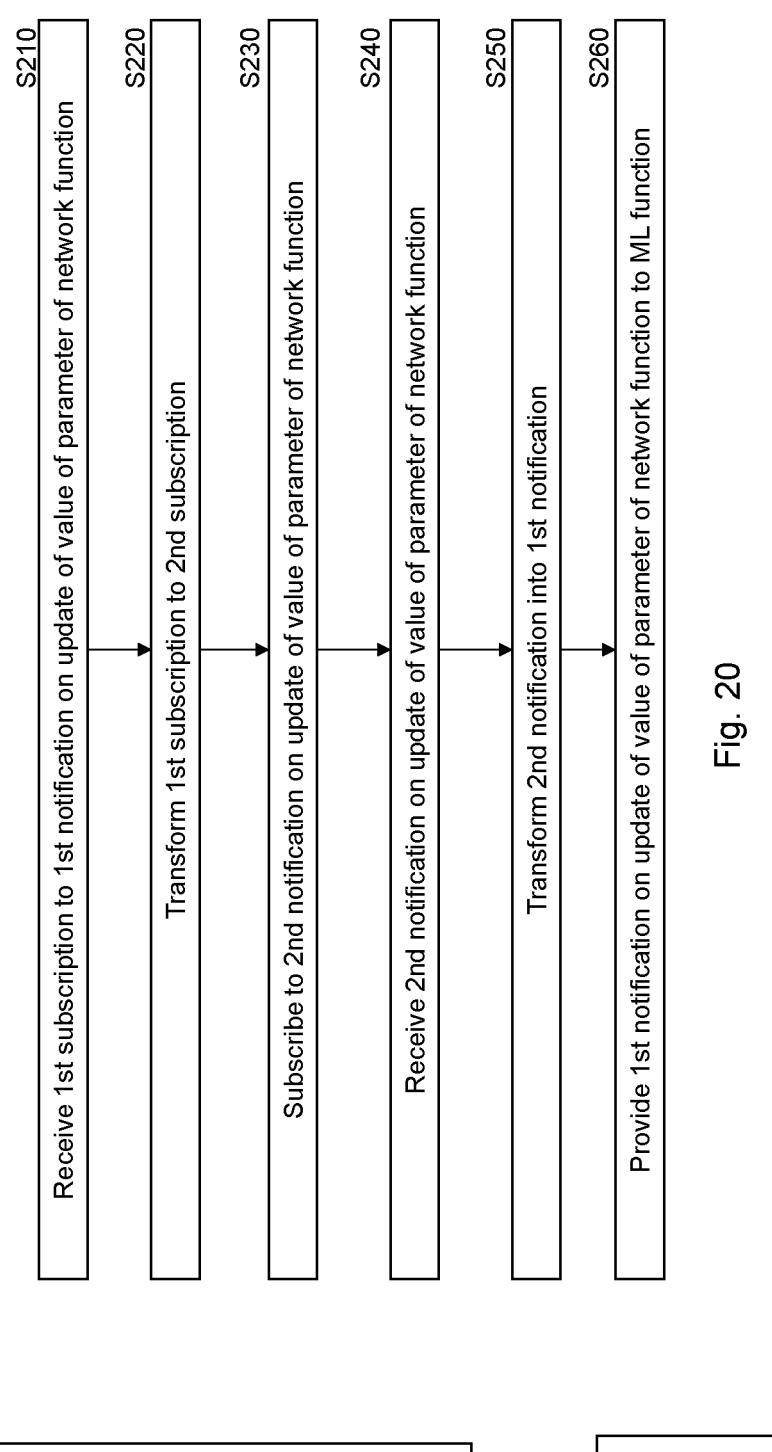

S210   Receive 1st subscription to 1st notification on update of value of parameter of network function S220   Transform 1st subscription to 2nd subscription S230   Subscribe to 2nd notification on update of value of parameter of network function S240   Receive 2nd notification on update of value of parameter of network function S250   Transform 2nd notification into 1st notification S260   Provide 1st notification on update of value of parameter of network function to ML function

DISTRIBUTED COORDINATION BETWEEN CONCURRENT ML FUNCTIONS

TECHNICAL FIELD

The present disclosure relates to dual connectivity and/or carrier aggregation.

Abbreviations

3GPP 3$^{rd}$ Generation Partnership Project
5G/6G/7G 5$^{th}$/6$^{th}$/7$^{th}$ Generation
AI Artificial Intelligence
CF Cognitive Function
CM Configuration Management
DN Distinguished Name
ID Identifier
IOC Information Object Class
ML Machine Learning
MNO Mobile Network Operator
MnS Management Service
MOI Managed Object Instance
NE Network Element
Near RT RIC Near-Real Time Radio Intelligent Controller
Non-RT RIC Non-Real Time Radio Intelligent Controller
OAM Operation and Maintenance
ORAN Open RAN
RAN Radio Access Network
rApp Non-RT RIC Application
RIC Radio Intelligent Controller
SMO Service Management and Orchestration
SON Self-Organizing Network
xApp Near-RT RIC Application

BACKGROUND

To reach a fully automated network system, several network automation functions are introduced into many network, such as communication networks and other networks (such as managing networks of power grids). Each of these functions has a different nature/operating type (e.g. rule based functions, machine learning based functions) and targets. These functions might be represented in different formats/flavours depending on the operational context:
  An ML function is any network function having some AI/ML capabilities (training, inference, testing . . . ); That is able to learn and optimize a network resource behavior.
  A Cognitive Function (CF) is defined as an intelligent entity able to at least one of
  1) learn the environment they are operating in,
  2) learn the optimal behavior fitting to a specific environment;
  3) learn from own experiences and that of other instances of the same or different OAM functions and
  4) learn to achieve higher-level goals and objectives as defined by the Mobile Network Operator (MNO).
  Examples of such functions are Self-Organizing Network functions (SON functions)
  rApps/xApps, defined as applications with a set of functionalities available in the Non-Real Time RIC (Non-RT RIC) Framework or in the Near Real Time RIC (Near RT RIC) Framework, respectively, in the ORAN architecture. This type of application might provide value added services related to RAN operation and optimization. The scope of rApps/xApps includes, but is not limited to, radio resource management, data analytics, and providing enrichment information. rApps/xApps might support AI/ML capabilities including model training, inference and updates. They might also provide policy-based guidance.

In the context of the present application, unless otherwise stated or made clear from the context, the term ML function refers to any Cognitive Function in the network with learning capabilities and that interacts with the environment by taking some action regarding some network's resources. This includes management functions, managed functions as well as rApps and xApps defined in the ORAN context.

REFERENCES

[1] Nash Jr, John F. "Equilibrium points in n-person games." Proceedings of the national academy of sciences 36.1 (1950): 48-49.

SUMMARY

It is an object to improve the prior art.

According to a first aspect, there is provided an apparatus comprising:
  one or more processors, and memory storing instructions that, when executed by the one or more processors, cause the apparatus to perform:
  receiving an update information on an updated value of a parameter of a network function and an identifier of a managing function responsible for the updating of the value of the parameter;
  defining a favorable range of values of the parameter based on the update information and a history of previous values of the parameter, wherein the history comprises, for each of the previous values of the parameter, the identifier of a respective managing function responsible for updating the value of the parameter to the respective previous value;
  calculating a new value of the parameter by optimizing a utility function and taking the favorable range as a constraint for the new value;
  updating the value of the parameter of the network function to the new value.

The instructions, when executed by the one or more processors, may cause the apparatus to perform
  checking whether updating the value of the parameter of the network function due to the new value is required;
  inhibiting the updating the value of the parameter of the network function by the new value in response to checking that the updating the value of the parameter of the network function due to the new value is not required.

The updating the value of the parameter of the network function due to the new value may not be required if the new value is within the favorable range of values.

The defining the favorable range may comprise generating a statistics on the values of the parameter based on the history of previous values and the update information, and the instructions, when executed by the one or more processors, may cause the apparatus to perform
  learning, for each of the managing functions, a strategy of the respective managing function for the parameter; and
  the defining the favorable range based on the strategies of the one or more managing functions.

The instructions, when executed by the one or more processors, may cause the apparatus to perform requesting the history of previous values of the parameter;

receiving the history of previous values of the parameter in response to the requesting the history of previous values of the parameter.

The instructions, when executed by the one or more processors, may cause the apparatus to perform subscribing to the update information;

the receiving the update information by receiving a notification in response to the subscribing, wherein the notification comprises the update information.

According to a second aspect of the invention, there is provided an apparatus comprising:

one or more processors, and memory storing instructions that, when executed by the one or more processors, cause the apparatus to perform:

receiving, from a machine learning function at a mediation function, a first subscription to a first notification on an update of a value of a parameter of a network function, wherein the first notification comprises an identifier of a managing function responsible for the updating of the value of the parameter;

transforming the first subscription to a second subscription in response to receiving the first subscription;

subscribing, at the network function by the second subscription, to a second notification on the update of the value of the parameter of the network function, wherein the second notification comprises the identifier of the managing function responsible for the updating of the value;

receiving, from the network function, the second notification on the update of the value of the parameter of the network function;

transforming the second notification into the first notification in response to the receiving the second notification from the network function;

providing the first notification on the update of the value of the parameter of the network function to the machine learning function in response to the receiving the first subscription from the machine learning function, wherein at least one of:

the first notification is different from the second notification; or the first subscription is different from the second subscription.

The machine learning function may belong to an architecture of an ORAN framework, and the first subscription and the first notification may belong to the ORAN framework.

The network function may belong to a 3GPP network, and the second subscription and the second notification may belong to a 3GPP specification.

According to a third aspect, there is provided a method comprising:

receiving an update information on an updated value of a parameter of a network function and an identifier of a managing function responsible for the updating of the value of the parameter;

defining a favorable range of values of the parameter based on the update information and a history of previous values of the parameter, wherein the history comprises, for each of the previous values of the parameter, the identifier of a respective managing function responsible for updating the value of the parameter to the respective previous value;

calculating a new value of the parameter by optimizing a utility function and taking the favorable range as a constraint for the new value;

updating the value of the parameter of the network function to the new value.

The method may further comprise checking whether updating the value of the parameter of the network function due to the new value is required;

inhibiting the updating the value of the parameter of the network function by the new value in response to checking that the updating the value of the parameter of the network function due to the new value is not required.

The updating the value of the parameter of the network function due to the new value may not be required if the new value is within the favorable range of values.

The defining the favorable range may comprise generating a statistics on the values of the parameter based on the history of previous values and the update information, and the method may further comprise learning, for each of the managing functions, a strategy of the respective managing function for the parameter; and the defining the favorable range based on the strategies of the one or more managing functions.

The method may further comprise requesting the history of previous values of the parameter;

receiving the history of previous values of the parameter in response to the requesting the history of previous values of the parameter.

The method may further comprise subscribing to the update information;

the receiving the update information by receiving a notification in response to the subscribing, wherein the notification comprises the update information.

According to a fourth aspect of the invention, there is provided a method comprising:

receiving, from a machine learning function at a mediation function, a first subscription to a first notification on an update of a value of a parameter of a network function, wherein the first notification comprises an identifier of a managing function responsible for the updating of the value of the parameter;

transforming the first subscription to a second subscription in response to receiving the first subscription;

subscribing, at the network function by the second subscription, to a second notification on the update of the value of the parameter of the network function, wherein the second notification comprises the identifier of the managing function responsible for the updating of the value;

receiving, from the network function, the second notification on the update of the value of the parameter of the network function;

transforming the second notification into the first notification in response to the receiving the second notification from the network function;

providing the first notification on the update of the value of the parameter of the network function to the machine learning function in response to the receiving the first subscription from the machine learning function, wherein at least one of:

the first notification is different from the second notification; or the first subscription is different from the second subscription.

The machine learning function may belong to an architecture of an ORAN framework, and the first subscription and the first notification may belong to the ORAN framework.

The network function may belong to a 3GPP network, and the second subscription and the second notification may belong to a 3GPP specification.

Each of the methods of the third and fourth aspects may be a method of dual connectivity and/or carrier aggregation.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some example embodiments, at least one of the following advantages may be achieved:

a fully automated network may be achieved;

conflicts between concurrent ML functions may be resolved or avoided;

no need for communication among different machine learning functions managing the network.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the example embodiments which is to be taken in conjunction with the appended drawings, wherein:

FIG. 5 shows a pseudo-code according to some example embodiments;

FIG. 7 shows a pseudo-code according to some example embodiments;

FIG. 9 shows a pseudo-code according to some example embodiments;

FIG. 11 shows a pseudo-code according to some example embodiments;

FIG. 13 shows a pseudo-code according to some example embodiments;

FIG. 15 (comprising FIGS. 15A and 15B) shows, for the mediation function according to some example embodiments, a pseudo-code;

FIG. 17 shows an apparatus according to an example embodiment;

FIG. 18 shows a method according to an example embodiment;

FIG. 19 shows an apparatus according to an example embodiment;

FIG. 20 shows a method according to an example embodiment;

FIG. 21 shows an apparatus according to an example embodiment;

DETAILED DESCRIPTION OF CERTAIN EXAMPLE EMBODIMENTS

Herein below, certain example embodiments are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the disclosure to the disclosed details.

Moreover, it is to be understood that the apparatus is configured to perform the corresponding method, although in some cases only the apparatus or only the method are described.

The network automation functions are able to learn and interact with each other or with their environment. In addition, some of these functions might work in parallel and share the same network resources but each with different objects. Since multiple functions might be interested in the same network resource or set of network resources (e.g., changing the same network parameter of the same managed element), a coordination mechanism is recommended to avoid/solve any potential conflict that might occur between these functions. Moreover, an intelligent mechanism would allow each function to learn the optimal behaviour in order to optimize network performance as a whole. The conflict resolution problem depends on many factors: 1. type of network functions considered and the possible interactions between these network functions (direct/indirect/no interaction), 2. Type of coordination solution, for example whether a centralized coordination unit exists to solve conflicts between different network functions or if the coordination is decentralized.

To solve a coordination problem, a classical approach is to have a central function that will guide one ML function in its choice of actions if there exist other ML functions that might be affected by these actions. This central function makes all the decisions about which and when an ML function can take actions; evaluates the effects of these actions, and decides the appropriate responses to the actions.

Another approach is to solve the coordination in a distributed (or de-centralised) way. In this approach, no central coordination function exists and, instead, each individual ML function focuses on optimizing its interest while modelling the behaviour of its concurrent ML functions. The ML function may ensure to select actions that do not only maximize its benefits but also minimizes possible negative effects on its concurrent ML functions in a kind of cooperative work. To achieve such a target, it is assumed that each ML functions is able to share with concurrent ML functions some information regarding the actions and the optimization constraints.

Figure 1:
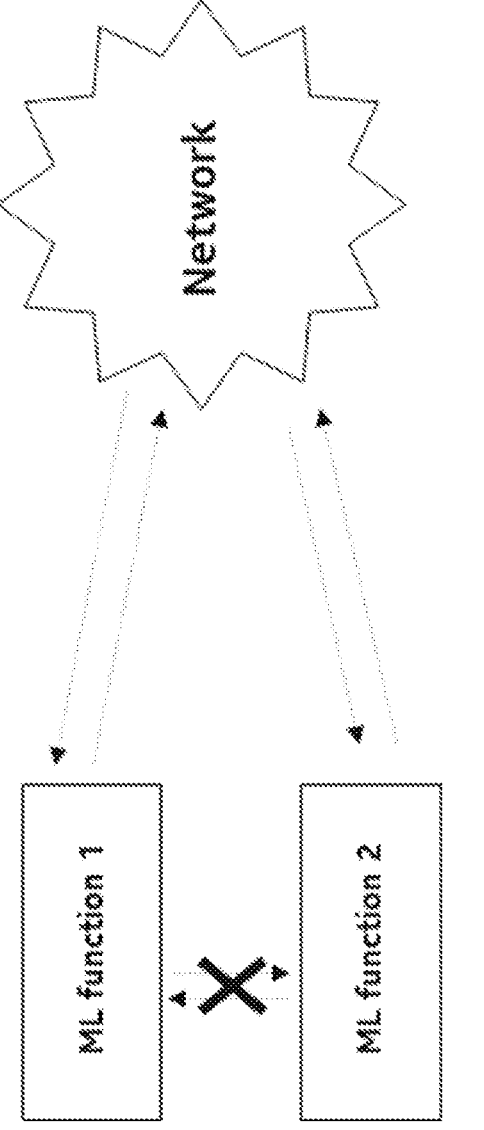
FIG. 1 shows a scenario to which some example embodiments are applicable.

In many practical scenarios, sharing information between concurrent ML functions might be limited or even impossible. As illustrated in FIG. 1, in such a scenario an ML function only interacts with the environment or the network and ignores how its actions affect the concurrent ML functions.

Some example embodiments provide a solution to enable distributed coordination between different concurrent ML functions under the assumption that these ML functions do not have any (direct or indirect) communication to exchange action/optimization requirements. In this context, coordinating ML functions may have at least one of the following characteristics:

Many ML functions might share the same resources and there exist conflicts of interests among them.

No central function for coordinating the ML functions.

No connection/interaction between ML functions that would synchronize their actions/optimizations.

Each ML function can learn and decide what is the best action for it by itself in a dynamic environment.

In the present context, a direct communication is a communication directly between the communication partners (ML functions), and an indirect communication is a communication, where the information provided by one of the communication partners is relayed via one or more intermediate stations to the other communication partners, wherein the relaying may comprise modifications of the format but does not comprise modifications of the content of the information.

Considering these limited capabilities, each ML function might try to optimize its own target (object) in a selfish mode ignoring concurrent ML function' strategies and possibly damaging overall network performance. However, some example embodiments provide a partial cooperation, where an ML function learns some constraints/requirements related to concurrent ML functions' strategies from the history of their actions. Namely, the ML function may learn values of a parameter related to a resource of interest (specific values, specific range of values, . . . ) favourable for concurrent ML functions based on information communicated by the environment (e.g., network) and related to these parameter updates. The ML function selects the action that not only maximizes its benefits but also has the least possible negative effects on its concurrent functions, where the impact on a concurrent ML function is learned through the history of its actions.

Some example embodiments provide, for example:

a distribution coordination mechanism (de-centralized) that can avoid conflicts of any type among different ML functions having limited communication (e.g. no communication about the respective objectives or other constraints).

The distributed coordination assumes each ML function dynamically interacts with its environment and determines the optimal configuration for the system.

Besides, the ML function learns strategies of other concurrent ML functions through their history of the actions taken. This history is shared by the network since no direct or indirect communication is assumed between different ML functions.

For example, this distributed coordination approach matches the context of ORAN where an ML function might be an rApp/xApp. By design, rApps/xApps are defined as separate applications that might have ML capabilities, and the only communication possible between the different rApps or xApps is through exchanging services or data through dedicated interfaces. For example, an rApp can request provision changes of the configuration of the network through O1-related services (O1: interface between SMO and managed network element) over the R1 interface (R1: interface between RIC and SMO). However, if two rApps (resp. two xApps) have the same Network Element (NE) target but different use-cases, any action taken by one rApp (resp. an xApp) can have an impact on the NE and then on the second rApp behaviour (resp. the second xApp behavior). Note that no mechanism for coordinating rApps/xApps is proposed in the ORAN specifications and no central coordination function is defined. Besides if two rApps/xApps are acting on the same resource for the same NE, these rApps/xApps do not have a mechanism to share feedback with other concurrent rApps/xApps regarding this resource in order to coordinate their actions. Therefore, some example embodiments help to coordinate rApps or xApps in the ORAN context.

The distributed coordination mechanism may assume that a direct communication between ML functions is not admissible or not possible (as in the ORAN case). The only information available for use in the coordination is information delivered by the network on updates of parameter values of network elements or managed functions. Therefore, some example embodiments provide, for example:

For an authorized consumer to request historical log of parameter value modifications including source of modifications (i.e., the function responsible for the modification). Accordingly, the network provides a historical log comprising previous values of a specific parameter or a set of parameters and the managing function responsible for modifying (updating) the respective previous value.

For an authorized consumer to subscribe to receive notifications when a value of a specific parameter or a set of parameters is/are modified/updated. Accordingly, the network receives a subscription request to one or more parameters and subsequently maps the subscription request to existing 3GPP subscription mechanisms on the O1 interface.

For an authorized consumer to receive notifications when a value of a specific parameter or a set of parameters is/are updated.

In some example embodiments, the ML function interacts directly with the network element to get the information on an update of a parameter value and the source of the update. In some example embodiments, the ML function interacts with the network element via a mediation function. Accordingly, the mediation function receives a subscription request to one or more parameters and subsequently maps the subscription request to subscription mechanisms on the interface to the network elements. Then, the mediation function notifies subscribing consumers of parameter value modifications including source of modification. That is, the mediation function may transform a subscription in the domain of the ML functions (such as ORAN) into the domain of the network functions (such as 3GPP). In the ORAN context, the mediation function may be used as part of the SMO/non-RT RIC to map the feedback mechanisms between different predefined interfaces in the SMO/Non-RT RIC (e.g., R1, O1).

According to some example embodiments, the procedure to mitigate conflicts between concurrent ML functions might be summarized as following:

The ML function may request a history of previous parameter values and the source of the modification of the parameter value. For example, the history may be provided as a ChangeLog related to a specific parameter or a set of parameters. This ChangeLog contains N ($N \geq 1$) previous changes to the value(s) of the specified set of parameter(s) and the DN of functions responsible for the change. This is used to learn the parameter statistics and calculate an initial "optimal parameter set".

The ML function gets information on updates of the value of the parameter to optimize. This feedback includes parameter values updates and the source of this update (an ID of the ML function responsible for the change). Thus, the ML function may be able to derive a range for the value of the parameter that is acceptable by concurrent ML functions controlling and updating this parameter. For example, based on the history of the parameter value updates and the sources of the parameter updates, the ML function might learn the favourable range of values of the parameter.

Having different parameters value ranges computed for different concurrent ML functions (if there are plural concurrent ML functions), the ML function can define its optimal value or its optimal set of values of the parameters of interest based on optimizing its utility function constrained by the computed concurrent ML function parameter value ranges. This approach results in a cooperative distributed optimization of parameter value setting, where each ML function optimizes a constrained utility function in a distributed manner.

In such example embodiments, there is no need for a separate central function to coordinate across different ML functions. Instead, each ML function interacts with the environment by requesting to update a parameter value when needed and by receiving a notification each time a value of a parameter of interest is updated by a concurrent ML function.

Figure 2:
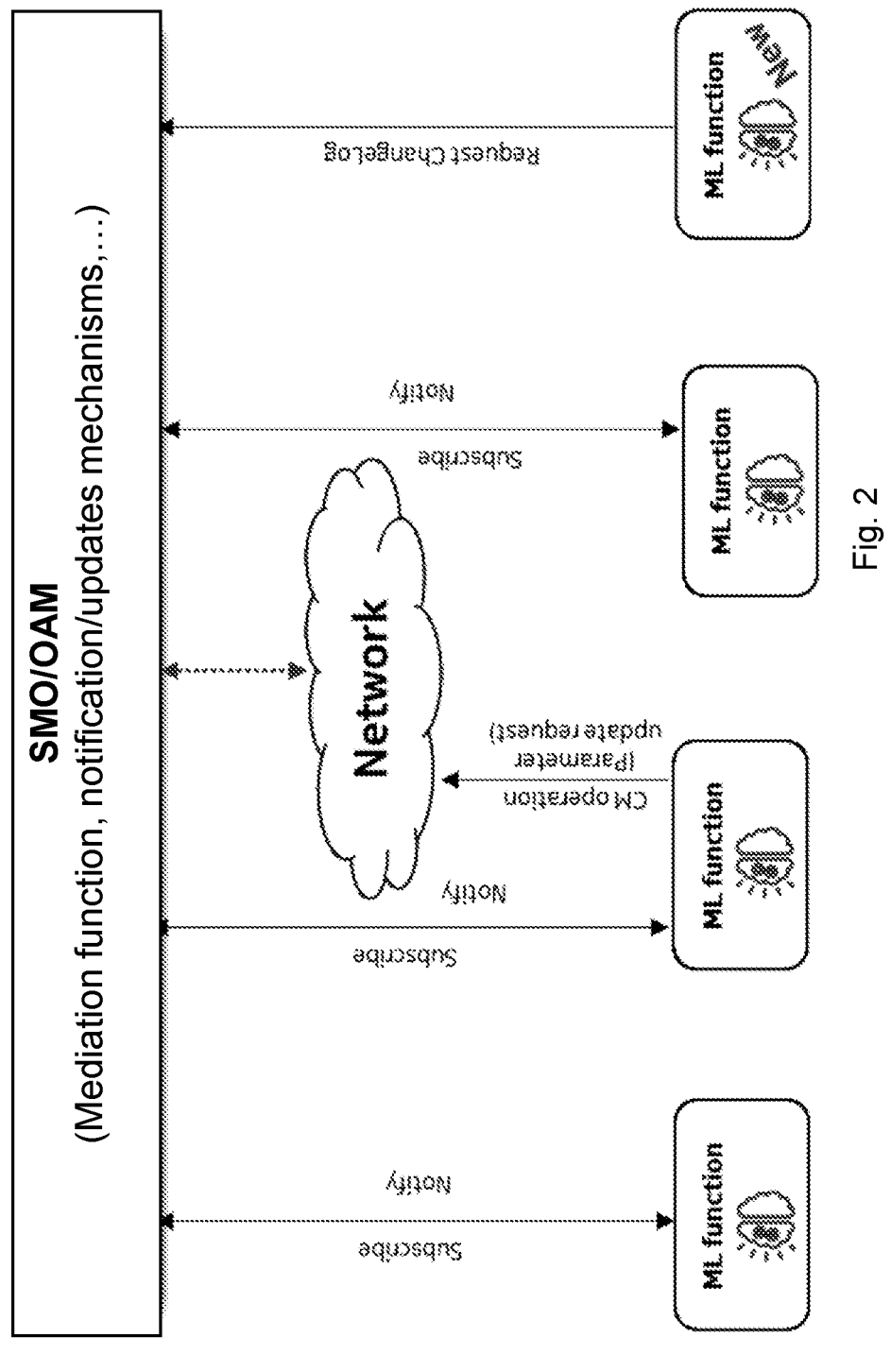
FIG. 2 shows an example embodiment including a mediation function.

FIG. 2 shows an example embodiment comprising a mediation function. The ML functions subscribe at the mediation function to get informed on updates of the parameter value. The mediation function subscribes to corresponding notifications from the network. The ML functions may operate on the network directly or via the mediation function. In addition, a ML function may request a change log on the parameter value (including the source of the updates of the parameter value) directly from the network or via the mediation function. While FIG. 2 shows different ML functions performing the actions of Requesting a change log, subscribe/notify, and CM operation, in some example embodiments, one ML function may perform plural or all of these actions.

Hereinafter, some example embodiments are described at greater detail.

Each ML function is a learning function itself, thus it can learn the favourable parameter configuration set to concurrent ML functions acting on the same parameter, hereinafter referred to as parameter statistics. Then, the ML function optimizes its utility function constrained to the parameter statistics and defines it is own favourable parameter value or set of values, it might be called "optimal parameter set".

Figure 3:
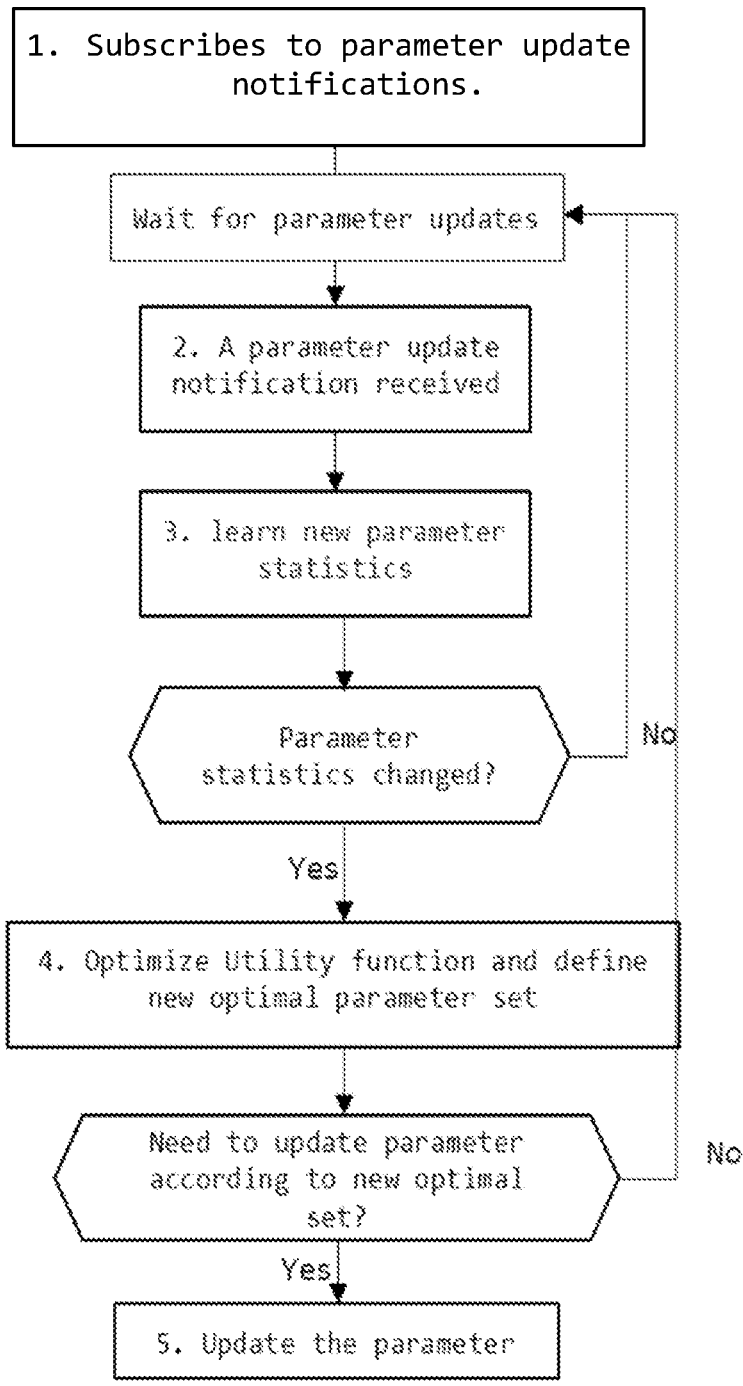
FIG. 3 shows a flow diagram according to some example embodiments.

FIG. 3 shows a flow diagram according to some example embodiments.

1. ML function subscribes to receive notification/feedback each time a parameter of interest is updated.
2. Once an update notification is received, the workflow of parameter optimization starts. Update notification includes the new value for the parameter as well as the ML function responsible for the update.
3. ML function updates the learned parameter statistics. Note that the parameter statistics might be defined as range having the following structure: [minparam, maxparam] where minparam denotes the minimum value and maxparam denotes the maximum value of the parameter of interest set by the same ML function. A respective range defines the favorable parameter value range set by each of the concurrent ML functions. It is a way to model the strategies of the other entities acting on the same parameter. This parameter statistics is considered as constraint range, where an ML function will optimize its individual utility function influenced by the contribution of other ML functions through this constraint range.

4. According to the updated parameter statistics, then the ML function re-adjust its utility function optimization if the parameter statistics has changed with the received parameter update. This implies that the strategy of one of the ML functions have changed and the parameter have new minparam and/or maxparam.

5. After optimizing the utility function, the ML function defines a new "optimal parameter set". Thus, the ML function evaluates if the actual parameter value needs to be re-updated as follows:

if the actual parameter value is within the new "optimal parameter set", then the ML function does not request to update the parameter value. This implies that the new parameter statistics does not strongly impact the utility function optimization and thus the strategy evolution of other ML functions did not impact ML function own strategy.

If the actual parameter value is not part of the "optimal parameter set", then the ML function requests to update the parameter values.

Note that the action of updating the parameter might generate parameter update notifications to the other ML functions that are acting on the same parameter and thus the new cycle of updating the parameter statistics and "optimal parameter set" starts. This may lead to several parameter updates cycles until the different ML functions converge to a common equilibrium (called Nash equilibrium [1]). This equilibrium is defined as a set of strategies where no ML function can lower its cost by unilaterally altering its strategy.

Note that the coordination capability may also be taken by a mediation function that assumes responsibility to coordinate more than 1 ML functions.

Figure 4:
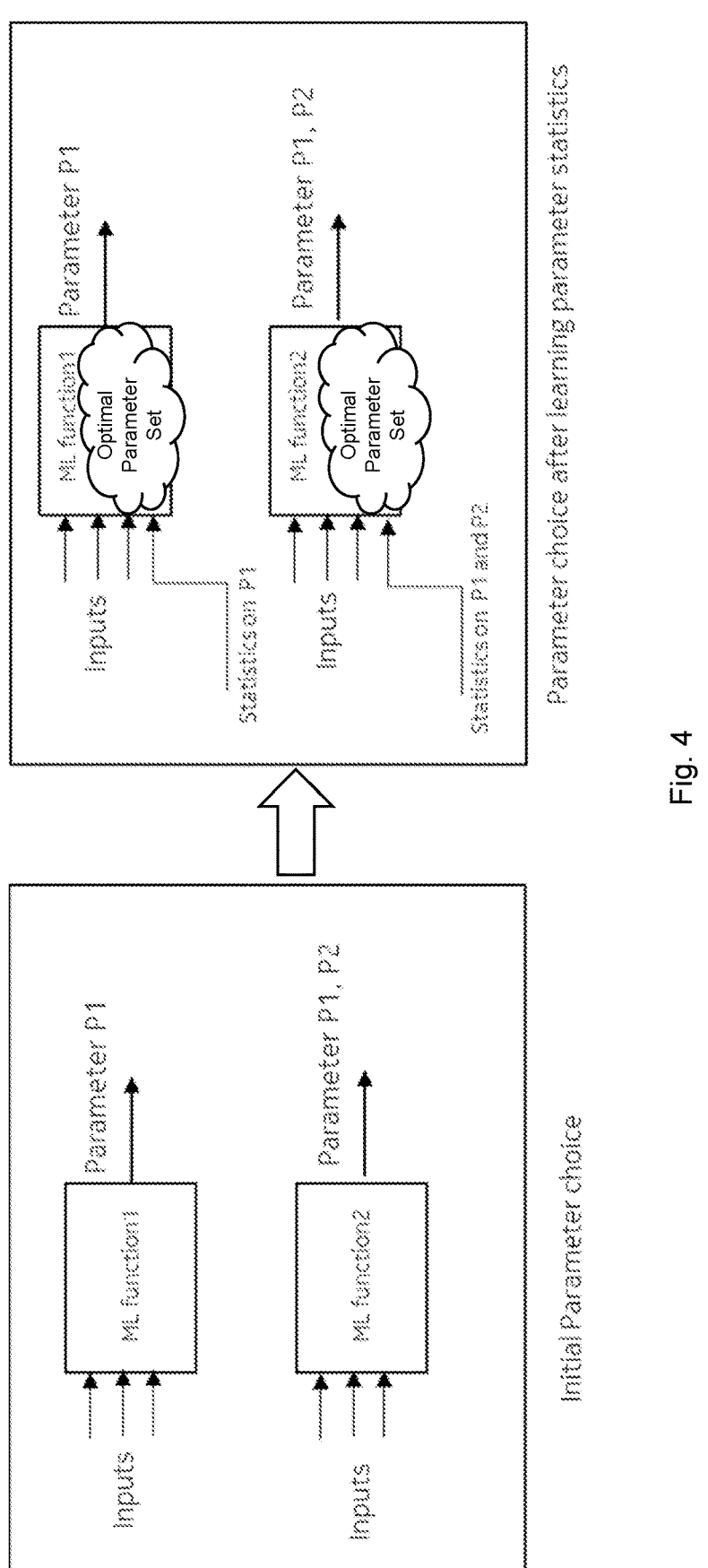
FIG. 4 illustrates "optimal parameter set" calculation according to some example embodiments.

It is described how an ML function reaches an "optimal parameter set" for parameters of interest. The problem could be modelled as a distributed optimization problem as detailed below where each ML function needs to optimize network parameters with respect to an individual utility function. FIG. 4 illustrates "optimal parameter set" calculation according to some example embodiments.

a) Assuming each ML function has it is own utility function, let's denote ML-Func1 an ML function having a utility function u_1 and acting on the parameter P1 for a network element and ML-Func2 is a second ML function having a utility function u_2 and acting on both parameters P1 and P2 for the same network element as shown in FIG. 4 (left side).

b) Calculating the "optimal parameter set" for the system in a distributed way comprises calculating the values of P1 that optimize the utility function u_1 and values of P1, P2 that optimize the utility function u_2. With a cooperative approach, an ML function may model the interest of concurrent ML functions acting on the same parameters. Therefore, to adjust the parameter set, P1, P2, an ML function according to an example embodiment uses the statistics related to these parameters, as shown in FIG. 4 (right side).

c) Assuming ML-Func2 has learned the P1 parameter statistics expressed as a range of values [P1 min, P1 max] that are most favorable to ML-Func1. Having this information, ML-Func2 will compute the value of (P1,P2) that optimize the u_2 (P1,P2) having P1 in [P1 min, P1 max].

Figure 6:
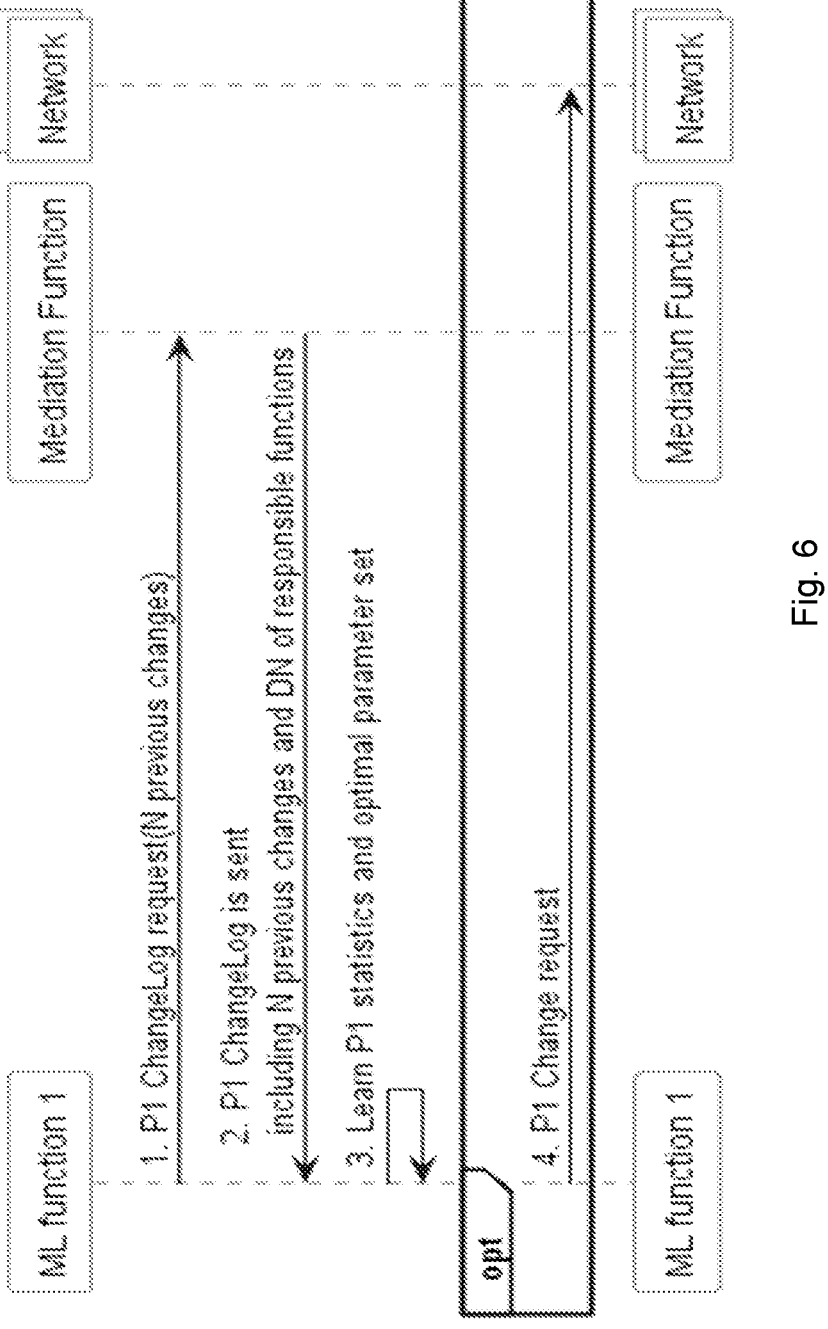
FIG. 6 shows a message flow according to some example embodiments.

Optionally, ML function 1 may require an initial "optimal parameter set" for P1. For the initial calculation of P1 "optimal parameter set", ML function 1 needs a list of N previous change requests to P1 and the DN of functions responsible for the change. This is needed to learn P1 statistics and calculate an initial "optimal parameter set" for P1. This is done as follows (see also the pseudo-code in FIG. 5 and the message flow in FIG. 6):

1. ML function 1 may request from the mediation function a changelog of N previous change requests and the DN of functions responsible for the change.
2. ML function 1 receives the ChangeLog including the N previous changes and the DN responsible functions
3. ML function 1 uses the information to learn P1 statistics and calculate initial "optimal parameter set".
4. ML function 1 decides if P1 requires an update. In that case, ML function 1 requests P1 parameter change accordingly.

Figure 8:
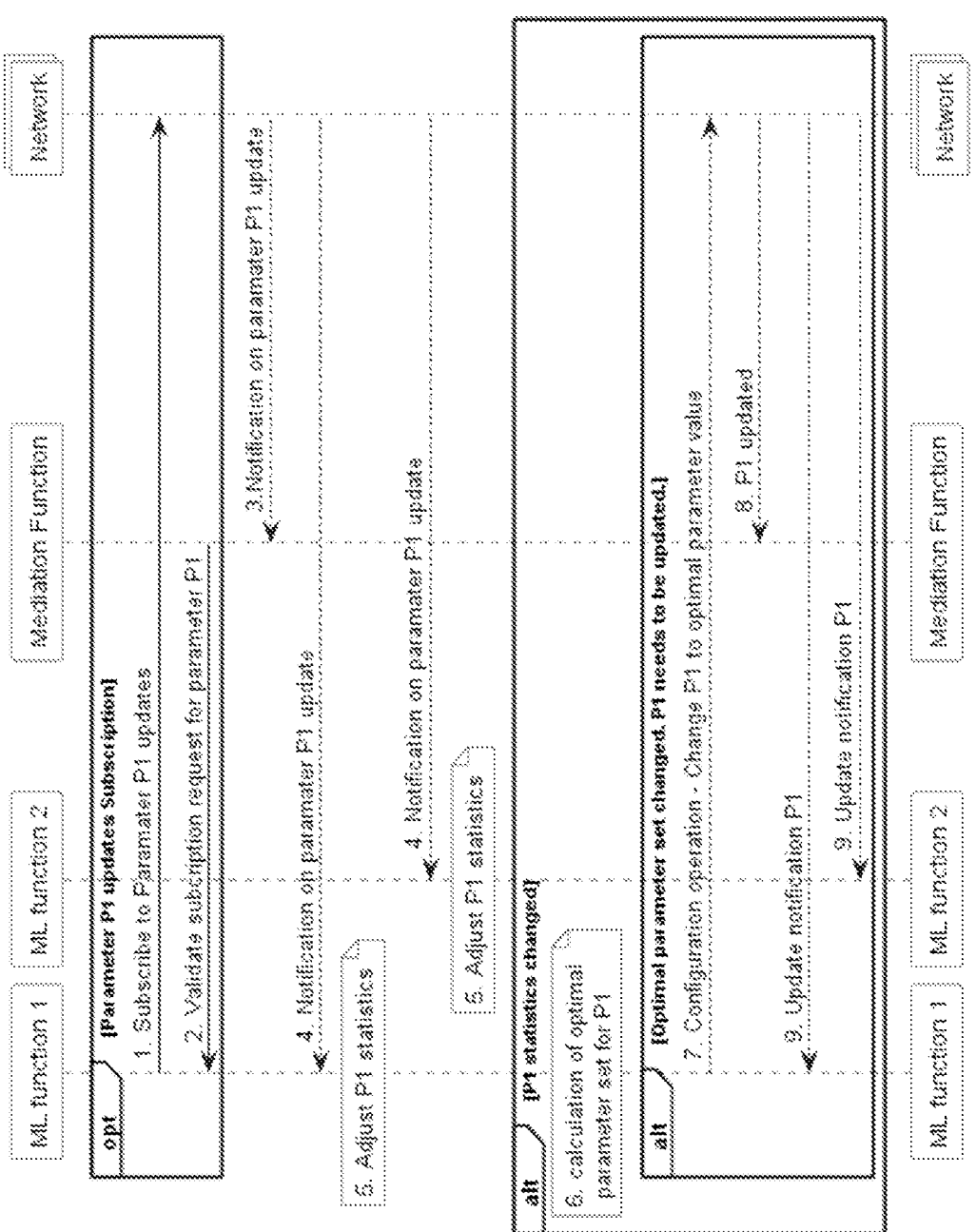
FIG. 8 shows a message flow according to some example embodiments.

In continuous operation, some example embodiments may adopt a message sequence flow as shown in FIG. 8 (with a corresponding pseudo-code, as shown in FIG. 7). In FIG. 8, two ML functions 1 and 2 are acting on a network. They receive the information on parameter value updates and the source of the update via a mediation function. Note that the number of ML functions is not limited to two but may be any number larger than 1. The mediation function is optionally and its presence may depend on the specific scenario.

The actions in FIG. 8 are as follows:

1. An ML function 1 may request to subscribe to receive an update notification each time a value of a parameter or a set of parameters have been updated, e.g. of parameter P1.
2. The ML function 1 receives a validation for the subscription request for parameter P1 updates.
3. The mediation function receives a new update of the value of the parameter P1 from the network and updates its changelog.
4. In addition each subscribed ML function may receive the same notification regarding the update of the value of parameter P1 (ML function 1 and 2 in the example assuming that ML function 2 is already subscribed to the same parameter P1 updates)
5. When an ML function receives a parameter update notification, it adjusts its statistics of the value of the parameter
6. If the statistics of P1 have changed, new parameter statistics may trigger a parameter update on one of the ML functions. As illustrated in FIG. 8, ML function 1 computes an "optimal parameter set" for parameter P1 constrained to the new statistics for P1
7. If the "optimal parameter set" has changed and P1 should be updated, the ML function requests the change of the value of the parameter P1 to the value resulting from the optimization process.
8. The network notifies the mediation function when the parameter P1 is updated.
9. Subscribed ML functions 1 and 2 receives update notifications for parameter P1 from the network.

Note that the "optimal parameter set" is a parameter set which may be but needs not be optimal in an absolute sense.

I.e., the "optimal parameter set" may be considered as a parameter set optimal for the given initial conditions and the effort used to calculate the "optimal parameter set" starting from the initial conditions using the given utility function.

The parameter update notification is an IOC containing information about the parameter change and ID of the network function responsible for the change. This information is used by the coordination mechanism according to some example embodiments in order for the ML function to learn the parameter statistics and in turn calculate an "optimal parameter set" according to its utility function.

Optionally, the ML function may request a change log for the value(s) of a set of parameter(s) and network functions responsible for setting (updating) the previous values of the parameter which can be used to learn parameter statistics and initial "optimal parameter sets".

Hereinafter, the information object classes (IOCs) and dataTypes as well as the procedure defined to realize distributed coordination among different ML functions acting on the same parameters are defined at greater detail according to some example embodiments. In some example embodiments, conventional mechanisms, such as notification subscription, and MOI changing requests are reused or enhanced in order to be useful in the coordination mechanism. However, in other example embodiments, novel or other IOCs, data types, and/or procedures may be used.

Figure 10:
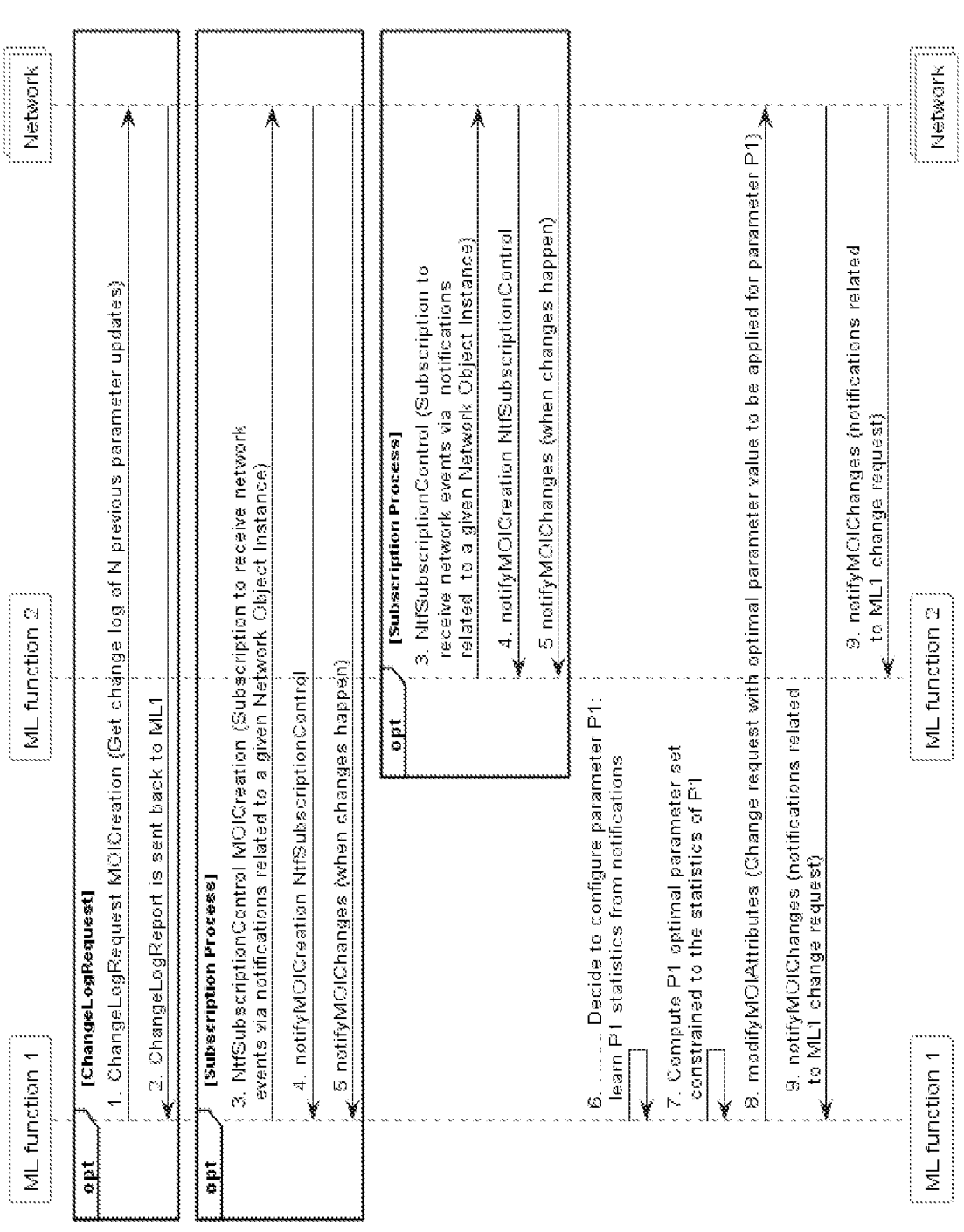
FIG. 10 shows a message flow according to some example embodiments of the invention.

FIG. 9 shows a pseudo-code and FIG. 10 a corresponding message flow according to some example embodiments of the invention. In FIG. 10, different ML functions (represented as ML function 1 and ML function 2) may act on the same set of parameters. Any ML function might subscribe to receive network events (update, delete) via notification process for any network object instance.

The actions in FIG. 10 are as follows:

1. ML function 1 may instantiate a ChangeLogRequest IOC instance on the MnS producer managing the network element of concern in order to get N previous parameter updates.
2. Accordingly, the MnS producer creates a ChangeLogReport containing information on the N previous parameter updates and SourceDN of the functions responsible for the changes.
3. In order to be able to receive future notifications related to an attribute value change, an ML function instantiates an NtfSubscriptionControl IOC instance on the Mns producer managing the network element of concern. The NtfSubscriptionControl has a scope attribute indicating the managed object included in the subscription and the type of the subscription which should be notifyMOIAttributeValueChanges.
4. The ML function receives a notification once the NtfSubscriptionControl is instantiated
5. A notification is sent to the ML function each time there is an update regarding the network object instance
6. If ML function 1 decides to update parameter P1, it first identifies the parameter P1 constraints regarding other ML functions (e.g., P1 range set). This can be done based on different P1 related notifications already received.
7. ML function 1 determines then the "optimal parameter set" for parameter P1
8. ML function 1 requests a change for the parameter P1 with the optimal value
9. The network shares the new value of P1 set by ML function 1 with the subscribed entities (ML function 2) in the network via notification process

US 12,592,856 B2

13

Figure 12:
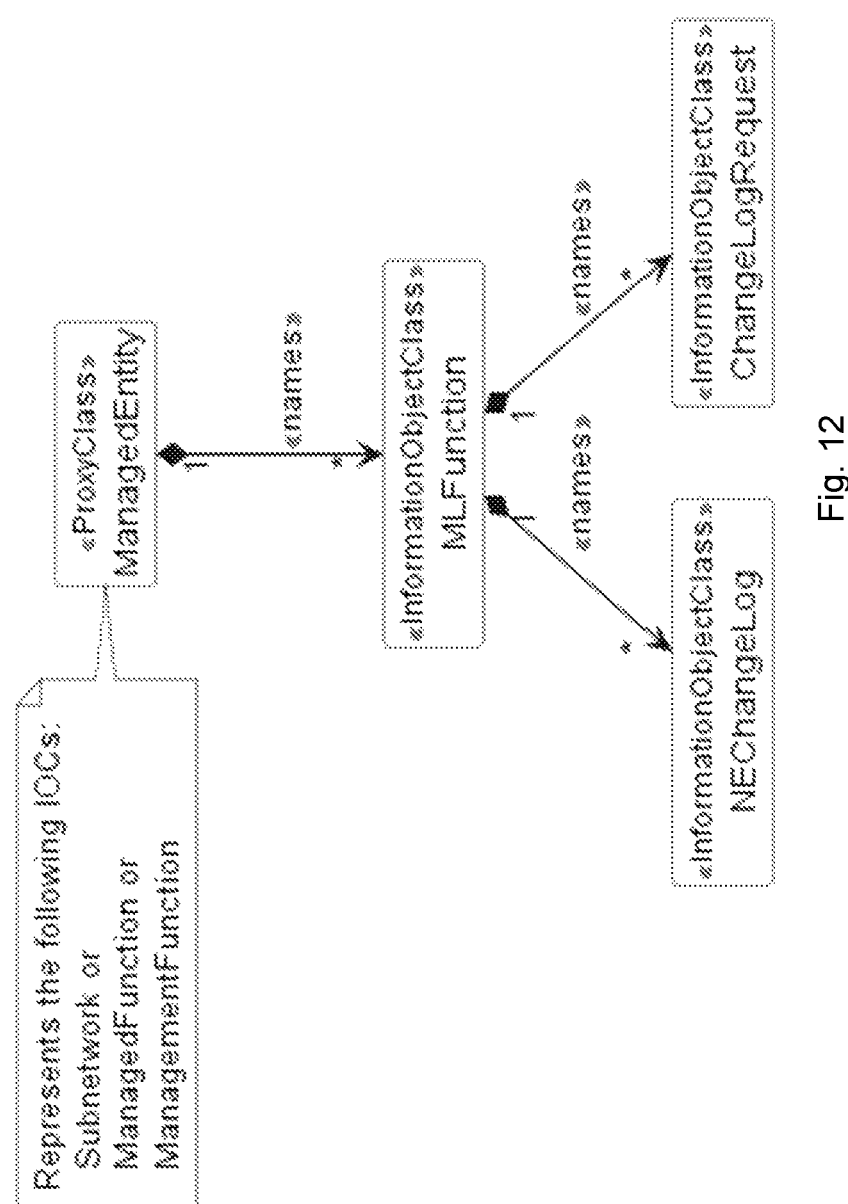
FIG. 12 shows an information model according to some example embodiments.
Figure 14:
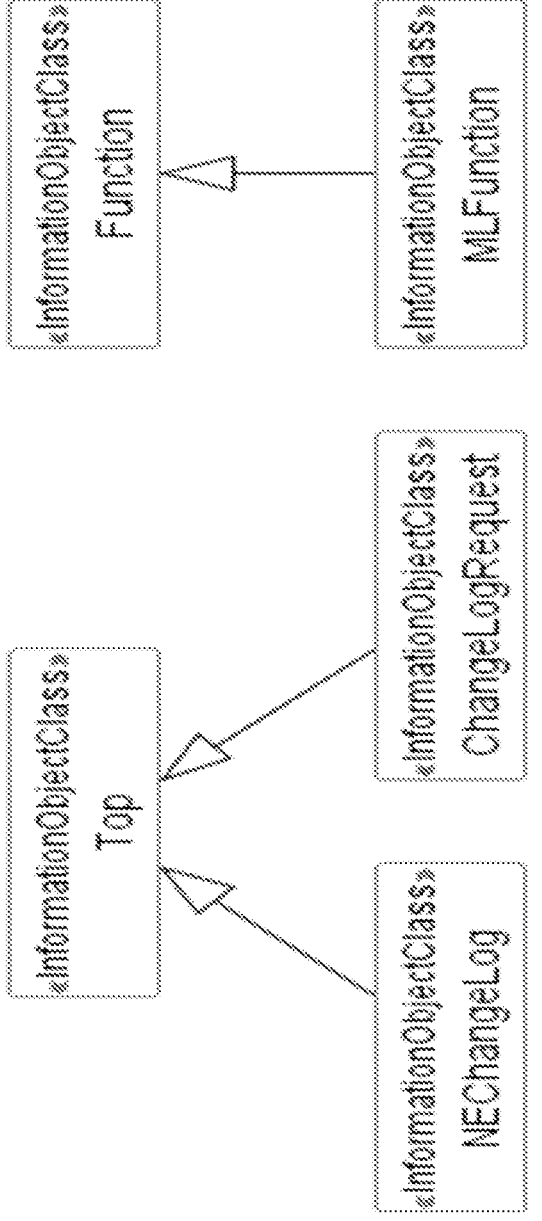
FIG. 14 shows inheritance relations for distributed ML coordination according to some example embodiments.

FIG. 11 shows a pseudo-code, and FIG. 12 a corresponding information model for distributed ML coordination according to some example embodiments. FIG. 13 shows a pseudo-code, and FIG. 14 corresponding inheritance relations for distributed ML coordination according to some example embodiments.

In some example embodiments, the following definitions may apply:

The IOC MLFunction represents the capabilities of the an ML function or a specific ML inference function. The ML function can subscribe to notifications on value changes in a certain parameter. It can then use these notifications to compile a record of its action which it can exchange with other ML functions. Alternatively it may receive notifications of changes from other ML functions from which it can construct statistics of such parameter changes.

TABLE 1

Attributes of MLFunction

| Parameter Name | S | Information Type / Legal Values | Comment |
|---|---|---|---|
| MLFunctionID | M | It indicates an identifier of a specific ML function | |

The IOC NEChangeLog is the log of all (or a predefined number of) changes (or of the changes not older than a predefined time) that have been executed on a specific NE. The MnS producer managing the network element of concern may capture a NEChangeLog that holds the recent changes on that network element. Because there may be different functions executing changes on the network element, the log must separately capture each specific change. As such, the log is a list of entries each of which captures the identifier of the source function or management service/entity requesting the MOI change request, the name the attribute on which the change has been effected and the specific value changes that has been executed.

TABLE 2

Attributes of NEChangeLog

| Parameter Name | S | Information Type / Legal Values | Comment |
|---|---|---|---|
| LogID | M | ID of the request | |
| ChangeLogEntry | M | Indicates the list of specific changes that have been executed | |

An ML function may instantiate a ChangeLogRequest MOI on the MnS producer in order to get N previous attribute values updates for a given resource and the DN of the functions responsible for the change. This may be used for parameter statistics calculation.

TABLE 3

Attributes of ChangeLogRequest

| Parameter Name | S | Information Type / Legal Values | Comment |
|---|---|---|---|
| RequestID | M | ID of the request | |
| MLfunctionDN | M | Indicates the DN of the management function instantiating the MOI ChangeLogRequest | |
| AttributeNames | M | Indicates the Names of the attributes for which a ChangeLogReport is needed | One or more attribute Names |
| ChangeLogReportIDs | O | Indicates the IDs of the ChangeLog reports associated with the ChangeLogRequest | Null if no report exists –> No previous parameter changes exist of stored. |

Within the NEChangeLog, each entry may have identifier, the simplest being timestamp of the exact time point at which the change was executed. The main content may be a triple that captures the identifier of the source function or management service/entity requesting the MOI change request as well as the name the attribute on which the change has been effected and the specific value changes that has been executed. This information can be obtained when the network elements emits a notifyMOIAttributeValueChanges notification following execution of the change.

TABLE 4

Attributes of NEChangeLog

| Parameter Name | S | Information Type / Legal Values | Comment |
|---|---|---|---|
| TimeStamp | M | It indicates the time at which the changes was effected and may be used as the ID of the specific change | |
| SourceDN | M | It indicates the DN of management service/entity requesting the MOI change request. | |

TABLE 4-continued

| Attributes of NEChangeLog | | | |
|---|---|---|---|
| Parameter Name | S | Information Type / Legal Values | Comment |
| AttributeNames | M | Indicates the Names of the attributes for which a ChangeLogReport is needed | One or more attribute Names |
| AttributeValueChange | O | Indicates the tupple [New attribute value, Old attribute value] | |

The MnS producer creates a ChangeLogReport corresponding to the instantiated ChangeLogRequest. This report contains the attributes of Table 5.

TABLE 5

| Attributes of ChangeLogReport | | | |
|---|---|---|---|
| Parameter Name | S | Information Type / Legal Values | Comment |
| ReportID | M | ID of the report | |
| RequestID | O | Indicates the ID of the ChangeLogRequest associated with the ChangeLogReport | Optional - Null - If no request exists for this log |
| AttributeName | M | Indicates the Name of the attribute for which this ChangeLogReport is associated | M - Each report is associated with a specific Attribute Name |
| ChangeLog | O | A list of tupples of the form: [Time Stamp, New attribute value, Old attribute value, DN of function responsible for the change] | Null –> No previous parameter changes exist or stored. |

The mediation function might be part of Non RT-RIC framework or part of the SMO framework. This function will do the mapping between O1 related services offered to the rAPPs through the R1 interface and the CM \ Notification \ subscription services specified on the O1 interface towards the network.

TABLE 6

| Definition of the mediation function | | |
|---|---|---|
| Use Case Stage | Evolution/Specification | <<Uses>> Related use case |
| Goal | Procedure for an rApp to update a parameter based on the best optimal configuration while taking into account the interest of other rApps in the same parameter. More than one rApp are performing CM operation on the same parameter / NE. Coordination is needed. | |
| Actors and roles | Non-RT RIC (rApp): generates O1 configurations SMO: provides implementation specific mapping between O1 related services offered on the R1 interface and the O1 interface | |
| Assumptions | rApp is interested in generating configurations on an ORAN E2 Node | |
| Preconditions | All relevant functions and components are instantiated and available. Non-RT RIC can receive configurations and notifications from E2 nodes via O1 | |
| Begins when | rApp interested in subscribing to change updates from ORAN E2 node | |
| Step 1 (M) | rApp 1 requests subscription to one or a set of ORAN E2 nodes while specifying one or more parameters of interest over the SME services offered on the R1 interface. | |
| Step 2 | The request is mapped by the SMO to the O1 subscription control services offered on the O1 interface. | |
| Step 3, 4(M) | Authorization check and subscription complete | |
| Step 5, 6(M) | Subscription response | |
| Step 7 (O) | rApp 2 requests Change log for one or more parameters in one or more ORAN E2 nodes. Information provided by the Non-RT RIC framework or the SMO in an implementation specific way. | |
| Step 8 (O) | ChangeLog report is sent to rApp 2 | |
| Step 9 (M) | rApp 2 performs O1 configurations in relation to one or more parameters in one or more ORAN E2 nodes. | |

TABLE 6-continued

| | | <<Uses>> Related use case |
|---|---|---|
| Use Case Stage | Evolution/Specification | |
| Step 10, 11 (M) | The request is mapped by the SMO to the O1 configuration management [Modify MOI attribute] services offered on the O1 interface. Response is generated. | |
| Step 12 (M) | rApp 2 receives response to the change request submitted | |
| Step 13 (M) | NotifyMOI change is mapped by the SMO in an implementation specific way to a notification on the R1 interface to subscribed rApp 1 | |
| Ends when | All subscribed rApps to receive a notification when a parameter in an ORAN E2 node is changed receive a notification including parameterInfo and rAppId responsible for the change. | |
| Exceptions | n/a | |
| Post Conditions | rApp 2 may calculate an optimal range for parameter of interest based on changes made by other rApps or network entities. | |
| Traceability | n/a | |

Figure 16:
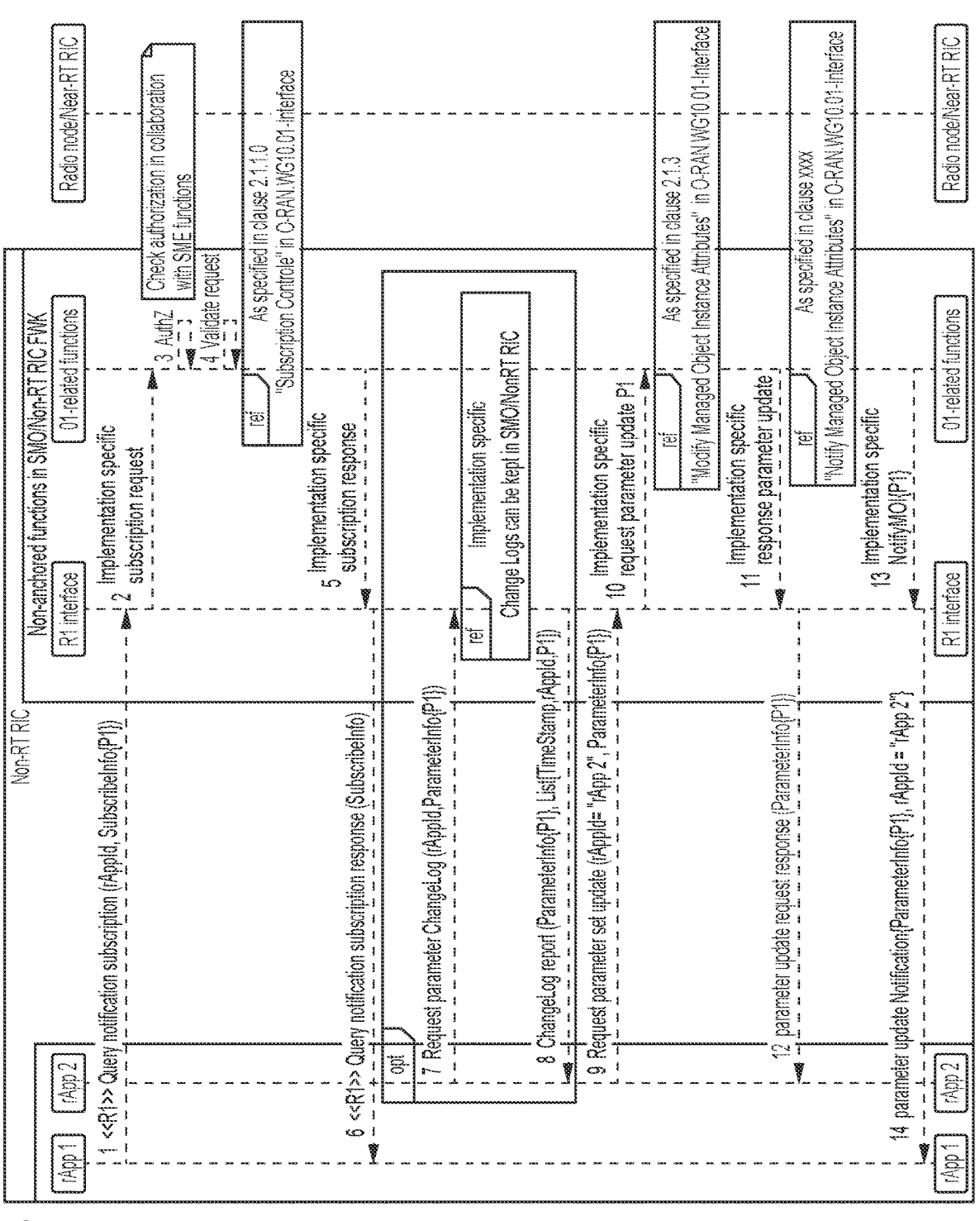
FIG. 16 shows, for the mediation function according to some example embodiments, a message sequence chart.

FIG. 15 shows, for the mediation function according to some example embodiments, a pseudo-code, and FIG. 16 a corresponding message sequence chart.

FIG. 17 shows an apparatus according to an example embodiment. The apparatus may be an ML function or an element thereof. FIG. 18 shows a method according to an example embodiment. The apparatus according to FIG. 17 may perform the method of FIG. 18 but is not limited to this method. The method of FIG. 18 may be performed by the apparatus of FIG. 17 but is not limited to being performed by this apparatus.

The apparatus comprises means for receiving 110, means for defining 120, means for calculating 130, and means for updating 140. The means for receiving 110, means for defining 120, means for calculating 130, and means for updating 140 may be a receiving means, defining means, calculating means, and updating means, respectively. The means for receiving 110, means for defining 120, means for calculating 130, and means for updating 140 may be a receiver, definer, identifier, and updater, respectively. The means for receiving 110, means for defining 120, means for calculating 130, and means for updating 140 may be a receiving processor, defining processor, calculating processor, and updating processor, respectively.

The means for receiving 110 receives an update information on an updated value of a parameter of a network function and an identifier of a managing function responsible for the updating of the value of the parameter (S110).

The means for defining 120 defines a favorable range of values of the parameter based on the update information and a history of previous values of the parameter (S120). The history comprises, for each of the previous values of the parameter, the identifier of a respective managing function responsible for updating the value of the parameter to the respective previous value.

The means for calculating 130 calculates a new value of the parameter by optimizing a utility function and taking the favorable range as a constraint for the new value (S130). Depending on the utility function, "optimizing" may mean either maximizing or minimizing. It is not required that the absolute maximum or the absolute minimum, respectively, of the utility function is found. It is sufficient that the utility function is sufficiently close (less than a predefined threshold) to a local maximum or a local minimum, respectively.

The means for updating 140 updates the value of the parameter of the network function to the new value (S140).

FIG. 19 shows an apparatus according to an example embodiment. The apparatus may be an mediation function or an element thereof. FIG. 20 shows a method according to an example embodiment. The apparatus according to FIG. 19 may perform the method of FIG. 20 but is not limited to this method. The method of FIG. 20 may be performed by the apparatus of FIG. 19 but is not limited to being performed by this apparatus.

The apparatus comprises first means for receiving 210, first means for transforming 220, means for subscribing 230, second means for receiving 240, second means for transforming 250, and means for providing 260. The first means for receiving 210, first means for transforming 220, means for subscribing 230, second means for receiving 240, second means for transforming 250, and means for providing 260 may be a first receiving means, first transforming means, subscribing means, second receiving means, second transforming means, and providing means, respectively. The first means for receiving 210, first means for transforming 220, means for subscribing 230, second means for receiving 240, second means for transforming 250, and means for providing 260 may be a first receiver, first transformer, subscriber, second receiver, second transformer, and provider, respectively. The first means for receiving 210, first means for transforming 220, means for subscribing 230, second means for receiving 240, second means for transforming 250, and means for providing 260 may be a first receiving processor, first transforming processor, subscribing processor, second receiving processor, second transforming processor, and providing processor, respectively.

The first means for receiving 210 receives, from a machine learning function at a mediation function, a first subscription to a first notification on an update of a value of a parameter of a network function (S210). The first notification comprises an identifier of a managing function responsible for the updating of the value of the parameter.

The first means for transforming 220 transforms the first subscription to a second subscription in response to receiving the first subscription (S220). The first subscription may be different from the second subscription.

The means for subscribing 230 subscribes, at the network function by the second subscription, to a second notification on the update of the value of the parameter of the network function (S230). The second notification comprises the identifier of the managing function responsible for the updating of the value. The first notification may be different from the second notification.

The second means for receiving 240 receives, from the network function, the second notification on the update of the value of the parameter of the network function (S220).

The second means for transforming 250 transforms the second notification into the first notification in response to the receiving the second notification from the network function (S250).

The means for providing 260 provides the first notification on the update of the value of the parameter of the network function to the machine learning function (S260) in response to the receiving the first subscription from the machine learning function of S210.

FIG. 21 shows an apparatus according to an example embodiment. The apparatus comprises at least one processor 810, at least one memory 820 storing instructions that, when executed by the at least one processor 810, cause the apparatus at least to perform the method according to at least one of the following figures and related description: FIG. 18, or FIG. 20.

Some example embodiments are explained where the ML functions do not have any interactions among themselves to exchange their requirements. However, in some example embodiments, the described method of coordination may be applied even if the ML functions do have some interaction among themselves to exchange their requirements. For example, this information on the requirements may be taken into account in addition to the "optimal parameter set" derived from the history of the parameter values. As another example, in some example embodiments, there may be a mixture of ML functions exchanging information on their requirements and ML function not exchanging information on their requirements acting on the same parameter (or parameter set) of a network function. In these example embodiments, each ML function exchanging information may take the information of the requirements received from the other ML functions into account similarly as the "optimal parameter set" derived from the history of the parameter values.

Some example embodiments are described in a service based architecture providing subscriptions and notifications. However, other example embodiments may not use a service based architecture. For example, the ML function may periodically (and/or event based) poll the network function (or the mediation function, if available) for updates of the parameter value.

The network may be of an arbitrary generation of 3GPP networks, such as 3G, 4G, 5G, 6G, or 7G. The network may be a communication network such as a wireless communication network different from a 3GPP network or a wired communication network. The network may be different from a communication network, such as a managing network of a power grid.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality. The same applies correspondingly to the terminal.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments provide, for example, a cognitive function (such as a CF of ORAN) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments provide, for example, an mediation function or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments. However, it should be noted that the description of the preferred example embodiments is given by way of example only and that various modifications may be made without departing from the scope of the disclosure as defined by the appended claims.

The terms "first X" and "second X" include the options that "first X" is the same as "second X" and that "first X" is different from "second X", unless otherwise specified. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The invention claimed is:

1. An apparatus of a fully automated network system based on an open radio access network (ORAN) domain, comprising:

one or more processors, and memory storing instructions that, when executed by the one or more processors, cause the apparatus to perform:

receiving, from a communications network, an update information on an updated value of a parameter related to a resource of interest of a network function of the fully automated network system, and an identifier of a managing function of the fully automated network system responsible for the updating of the value of the parameter;

defining a favorable range of values of the parameter based on the update information and a history of previous values of the parameter, wherein the history comprises, for each of the previous values of the parameter, the identifier of a respective managing function responsible for updating the value of the parameter to the respective previous value;

calculating a new value of the parameter by optimizing a utility function and taking the favorable range as a constraint for the new value;

checking whether updating the value of the parameter of the network function due to the new value is required;

inhibiting the updating the value of the parameter of the network function by the new value in response to checking that the updating the value of the parameter of the network function due to the new value is not required; and subscribing to the update information;

wherein the update information is received by receiving a notification in response to the subscribing, and wherein the notification comprises the update information.

2. The apparatus according to claim 1, wherein the updating the value of the parameter of the network function due to the new value is not required if the new value is within the favorable range of values.

3. The apparatus according to claim 1, wherein the defining the favorable range comprises generating statistics on the values of the parameter based on the history of previous values and the update information, and wherein the instructions, when executed by the one or more processors, cause the apparatus to perform learning, for the managing function, a strategy of the respective managing function for the parameter; and the defining the favorable range based on the strategies of the one or more managing functions.

4. The apparatus according to claim 1, wherein the instructions, when executed by the one or more processors, cause the apparatus to perform;

requesting, from the communications network, the history of previous values of the parameter;

receiving, from the communications network, the history of previous values of the parameter in response to the requesting the history of previous values of the parameter.

5. The apparatus according to claim 1, wherein the instructions, when executed by the one or more processors, cause the apparatus to perform:

subscribing to the communications network to receive the update information from the communications network;

the receiving, from the communications network, the update information by receiving a notification in response to the subscribing, wherein the notification comprises the update information.

6. A method of a machine learning function of a fully automated network system based on an open radio access network (ORAN) domain, comprising:

one or more processors, and memory storing instructions that, when executed by the one or more processors, cause the apparatus to perform:

receiving, from a communications network, an update information on an updated value of a parameter related to a resource of interest of a network function of the fully automated network system, and an identifier of a managing function of the fully automated network system responsible for the updating of the value of the parameter;

defining a favorable range of values of the parameter based on the update information and a history of previous values of the parameter, wherein the history comprises, for each of the previous values of the parameter, the identifier of a respective managing function responsible for updating the value of the parameter to the respective previous value;

calculating a new value of the parameter by optimizing a utility function and taking the favorable range as a constraint for the new value;

checking whether updating the value of the parameter of the network function due to the new value is required;

inhibiting the updating the value of the parameter of the network function by the new value in response to checking that the updating the value of the parameter of the network function due to the new value is not required; and subscribing to the update information;

wherein the update information is received by receiving a notification in response to the subscribing, and wherein the notification comprises the update information.

7. The method according to claim 6, wherein the updating the value of the parameter of the network function due to the new value is not required if the new value is within the favorable range of values.

8. The method according to claim 6, wherein the defining the favorable range comprises generating a statistics on the values of the parameter based on the history of previous values and the update information, and the method further comprises:

learning, for each of the managing functions, a strategy of the respective managing function for the parameter; and the defining the favorable range based on the strategies of the one or more managing functions.

9. The method according to claim 6, further comprising:

requesting the history of previous values of the parameter; and receiving the history of previous values of the parameter in response to the requesting the history of previous values of the parameter.

* * * * *